US007899346B2

(12) United States Patent
Kubo et al.

(10) Patent No.: US 7,899,346 B2
(45) Date of Patent: Mar. 1, 2011

(54) HUMIDITY DETECTING DEVICE, AND IMAGE FORMING APPARATUS PROVIDED THEREWITH

(75) Inventors: Isao Kubo, Nagoya (JP); Kenichi Dan, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 225 days.

(21) Appl. No.: 12/361,018

(22) Filed: Jan. 28, 2009

(65) Prior Publication Data

US 2009/0190942 A1 Jul. 30, 2009

(30) Foreign Application Priority Data

Jan. 29, 2008 (JP) ............................ 2008-018162

(51) Int. Cl.
*G03G 15/00* (2006.01)
*G01N 27/00* (2006.01)

(52) U.S. Cl. ............................ 399/44; 399/94; 399/97; 73/335.02; 73/335.05

(58) Field of Classification Search .................. 399/44, 399/88, 94, 97; 73/29.01, 73, 335.02, 335.05
See application file for complete search history.

(56) References Cited

U.S. PATENT DOCUMENTS

| | | | | |
|---|---|---|---|---|
| 5,623,330 | A * | 4/1997 | Ishibashi | 399/310 |
| 5,656,928 | A | 8/1997 | Suzuki et al. | |
| 2007/0186650 | A1 | 8/2007 | Hayakawa | |
| 2008/0112716 | A1* | 5/2008 | Jeschonek | 399/44 |

FOREIGN PATENT DOCUMENTS

| | | | |
|---|---|---|---|
| JP | 57-017104 | A | 1/1982 |
| JP | 61-091552 | A | 5/1986 |
| JP | 61-128149 | A | 6/1986 |
| JP | 3-138553 | A | 6/1991 |
| JP | 5-149905 | A | 6/1993 |
| JP | 06-221882 | | 8/1994 |
| JP | 8-029370 | A | 2/1996 |
| JP | 9-005371 | A | 1/1997 |
| JP | 2001-153438 | | 6/2001 |
| JP | 2006-275761 | | 10/2006 |
| JP | 2007-248455 | A | 9/2007 |

OTHER PUBLICATIONS

JP Office Action dtd Jan. 19, 2010, JP Appln. 2008-018162, English Translation.

* cited by examiner

*Primary Examiner*—David P Porta
*Assistant Examiner*—Mark R Gaworecki
(74) *Attorney, Agent, or Firm*—Banner & Witcoff, Ltd.

(57) ABSTRACT

The humidity detecting device includes a detection unit and a controller. The detection unit includes a humidity sensor for producing a humidity detection signal by detecting a humidity, a temperature sensor for producing a temperature detection signal by detecting a temperature surrounding the humidity sensor, and a common power supply line connected to the humidity sensor and the temperature sensor. The controller includes an application circuit for applying a power supply voltage to the humidity sensor and the temperature sensor through the common power supply line, a read circuit for producing a read-out humidity value corresponding to the humidity detection signal and a read-out temperature value corresponding to the temperature detection signal, and a correction circuit for correcting the read-out humidity value based on the read-out temperature value.

16 Claims, 17 Drawing Sheets

FIG.6

| A/D(8bit) | VOLTAGE[V] | 5°C | 6°C | 7°C | 8°C | 9°C | 10°C | 11°C | 12°C | 13°C | 14°C | 15°C |
|---|---|---|---|---|---|---|---|---|---|---|---|---|
| 0 | 0 | | | | | | | | | | | |
| 1 | 0.020 | 25 | 25 | 24 | 24 | 23 | 23 | 22 | 22 | 21 | 21 | 20 |
| 2 | 0.039 | 28 | 27 | 27 | 26 | 26 | 25 | 25 | 25 | 24 | 24 | 23 |
| 3 | 0.059 | 29 | 29 | 28 | 28 | 28 | 27 | 27 | 26 | 26 | 25 | 25 |
| 4 | 0.078 | 31 | 30 | 30 | 29 | 29 | 28 | 28 | 28 | 27 | 27 | 26 |
| 5 | 0.098 | 32 | 31 | 31 | 30 | 30 | 30 | 29 | 29 | 28 | 28 | 27 |
| 6 | 0.117 | 33 | 32 | 32 | 31 | 31 | 30 | 30 | 29 | 29 | 29 | 28 |
| 7 | 0.137 | 34 | 33 | 33 | 32 | 32 | 31 | 31 | 30 | 30 | 29 | 29 |
| 8 | 0.156 | 34 | 34 | 33 | 33 | 32 | 32 | 32 | 31 | 31 | 30 | 29 |
| 9 | 0.176 | 35 | 34 | 34 | 34 | 33 | 33 | 32 | 32 | 31 | 31 | 30 |
| 10 | 0.195 | 36 | 35 | 35 | 34 | 34 | 33 | 33 | 32 | 32 | 31 | 31 |
| 11 | 0.215 | 36 | 36 | 35 | 35 | 34 | 34 | 33 | 33 | 32 | 32 | 31 |
| 12 | 0.234 | 37 | 36 | 36 | 35 | 35 | 34 | 34 | 33 | 33 | 32 | 32 |
| 13 | 0.254 | 37 | 37 | 36 | 36 | 35 | 35 | 34 | 34 | 33 | 33 | 32 |
| 14 | 0.273 | 38 | 37 | 37 | 36 | 36 | 35 | 35 | 34 | 34 | 33 | 33 |
| 15 | 0.293 | 38 | 38 | 37 | 37 | 36 | 36 | 35 | 35 | 34 | 34 | 33 |
| 16 | 0.313 | 39 | 38 | 38 | 37 | 37 | 36 | 36 | 35 | 35 | 34 | 34 |
| 17 | 0.332 | 39 | 39 | 38 | 38 | 37 | 37 | 36 | 36 | 35 | 34 | 34 |
| 18 | 0.352 | 39 | 39 | 38 | 38 | 37 | 37 | 36 | 36 | 35 | 35 | 34 |
| 19 | 0.371 | 40 | 39 | 39 | 38 | 38 | 37 | 37 | 36 | 36 | 35 | 35 |
| 20 | 0.391 | 40 | 40 | 39 | 39 | 38 | 38 | 37 | 37 | 36 | 36 | 35 |

TEMPERATURE

HUMIDITY SENSOR DETECTED VALUES

A

B

FIG.8

| | | | |
|---|---|---|---|
| POWER SUPPLY VOLTAGE | Min | Typ | Max |
| | ↓ | | ↓ |
| THERMISTOR DETECTED VOLTAGE | SMALL | | LARGE |
| | ↓ | | ↓ |
| DETECTED TEMPERATURE | LOW TEMPERATURE | | HIGH TEMPERATURE |

HUMIDITY DETECTING DEVICE, AND IMAGE FORMING APPARATUS PROVIDED THEREWITH

CROSS REFERENCE TO RELATED APPLICATION

This application claims priority from Japanese Patent Application No. 2008-018162 filed Jan. 29, 2008. The entire content of this priority application is incorporated herein by reference.

TECHNICAL FIELD

The present disclosure relates to a humidity detecting device, and an image forming apparatus provided therewith.

BACKGROUND

There is a known art related to a sensor module, including a humidity sensor and a controller for scanning a proper measured value, that varies according to temperature change, from a detected value produced by the humidity sensor, based on a data table prepared with a setting value of temperature varied by a physical quantity changing device. However, in the art, when detecting humidity around an external apparatus such as an image forming apparatus, to use the sensor module including the controller results in a higher cost, thereby further increasing the cost for mounting the physical quantity changing device for controlling the variation of detected values.

SUMMARY

The present invention has been made on the basis of the above circumstances, and provides a technology for reducing the cost for humidity detection as well as the errors of measured values. A humidity detecting device as one aspect of this invention comprises a detection unit for detecting a humidity and a controller for controlling the detection unit. The detection unit includes a humidity sensor for producing a humidity detection signal by detecting the humidity, a temperature sensor for producing a temperature detection signal by detecting a temperature surrounding the humidity sensor. The humidity sensor and the temperature sensor are connected by a common power supply. The controller includes an application circuit for applying a power supply voltage to the humidity sensor and the temperature sensor through the common power supply line, a read circuit for producing a read-out humidity value corresponding to the humidity detection signal and a read-out temperature value corresponding to the temperature detection signal, and a correction circuit for correcting the read-out humidity value based on the read-out temperature value.

According to the above configuration, the detection unit is provided only with sensor elements of the humidity sensor and the temperature sensor, thereby reducing the cost thereof. In addition, the detection unit includes a common power supply line connected to the humidity sensor and the temperature sensor, thereby reducing the number of signal lines connecting between the detection unit and the controller, and thus reducing the wiring cost. And also, supplying the voltage to both the humidity sensor and the temperature sensor via the common power supply line enables such as variation of the power supply to be absorbed. In short, the present configuration improves the accuracy of the humidity detecting device, and at the same time, reduces the cost thereof. Furthermore, even when the detected humidity varies according to the environmental temperature (as a result of depending on the property of the humidity sensor to be used), the correction of the correction circuit using such as, for example, a temperature correction table enables a humidity to be detected without depending on the environmental temperature.

BRIEF DESCRIPTION OF THE DRAWINGS

FIG. 6 is a table showing an example of a temperature correction table;

FIG. 8 is an explanatory diagram showing a relationship between a power supply voltage and a detected temperature;

DETAILED DESCRIPTION

1. Whole Constitution of the Humidity Detecting Device

Figure 1:
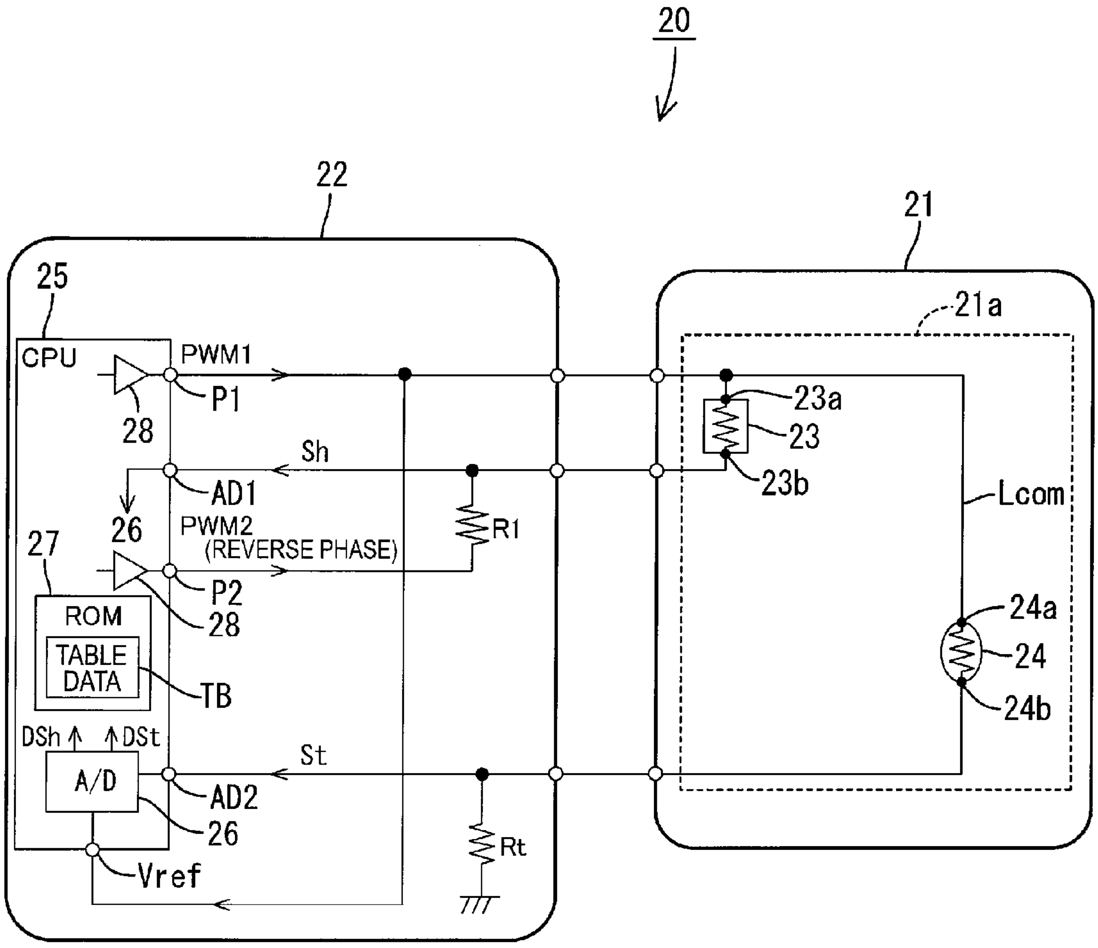
FIG. 1 is a schematic circuit diagram of a humidity detecting device according to one illustrative aspect of the present invention.

In reference to FIGS. 1 to 8, a humidity detecting device according to one illustrative aspect of the present invention is described. FIG. 1 is a schematic circuit diagram of a humidity detecting device 20 according to one illustrative aspect of the present invention. As shown in FIG. 1, the humidity detecting device 20 generally includes a detection unit 21 for detecting humidity and a controller 22 for controlling the detection unit 21.

The detection unit 21 includes a humidity sensor 23 which is formed on the same sensor substrate 21*a* and detects humidity to generate a humidity detection signal Sh, a temperature sensor 24 which detects the temperature surrounding the humidity sensor 23 and generates a temperature detection signal St, and a common power supply line Lcom connected in common with the humidity sensor 23 and the temperature sensor 24 (here, for example, a thermistor).

Here, a polymer-based water-soluble humidity sensor is preferred for use as the humidity sensor 23. This is because the polymer-based water-soluble humidity sensor has a low cost and a wide humidity detection range, which is capable of preferably detecting humidity even in a high humidity environment. Additionally, since the humidity sensor 23 and the temperature sensor 24 are provided on the same substrate, the cost for the detection unit 21 is reduced.

The controller 22 includes a CPU (one example of an application circuit) 25 for applying the power supply voltage to the humidity sensor 23 and the temperature sensor 24 via the common power supply line Lcom.

The CPU 25 at the time of humidity detection applies an AC voltage at least to the humidity sensor 23 as a power supply voltage, since the polymer-based water-soluble humidity sensor requires an AC drive due to its property. The CPU 25 applies a first PWM signal (one example of a first voltage) PWM1 to a first terminal (one example of the one end) 23*a* in the humidity sensor and a first terminal 24*a* in the temperature sensor via a first PWM port (one example of a first application section) P1 and the common power supply line Lcom, in order to apply the AC voltage.

In addition, the CPU 25 applies a second PWM signal (one example of a second voltage) PWM2 having a reverse phase against the first PWM signal PWM1 to a second terminal (one example of the other end) 23*b* in the humidity sensor via a second PWM port (one example of a second application section) P2, in order to apply the AC voltage. In short, the humidity sensor 23 is driven in alternate current by a synthesized signal between the first PWM signal PWM1 and the second PWM signal PWM2. And also, the first PWM signal PWM1 and the second PWM signal PWM2 are respectively output through an output buffer 28.

The controller 22 also includes a first detection resistor R1, which is connected between the second terminal 23*b* in the humidity sensor and the second PWM port P2 and generates the humidity detection signal Sh by voltage division with the resistance of the humidity sensor 23, and a temperature detection resistor Rt, which is connected between the second terminal 24*b* in the temperature sensor and the ground and generates a temperature detection signal St by the voltage division with the resistance of the temperature sensor 24.

The CPU 25 also includes an A/D converter circuit (one example of a read circuit) 26. The A/D converter circuit 26 receives the humidity detection signal Sh via a first AD port AD1 and generates a read-out humidity value DSh as a digital value according to the humidity detection signal Sh. The A/D converter circuit 26 also receives the temperature detection signal St via a second AD port AD2 and generates a read-out temperature value DSt as a digital value according to the temperature detection signal St. The CPU 25 conducts a processing related to the humidity detection, based on the read-out humidity value DSh and the read-out temperature value DSt.

In addition, in the controller 22, the first PWM signal PWM1 supplied to the common power supply line Lcom is also supplied to the A/D converter circuit 26 via an input terminal Vref. Here, the A/D converter circuit 26 directly reads the first PWM signal PWM1 output from the first PWM port P1 as a reference voltage for comparison, so that the value of first, second, and third voltages can be read-out by comparing with the reference voltage (maximum value). Therefore, even when a variation of the output buffer 28 or of the power supply is present, an error of A/D conversion caused by the variation can be cancelled.

The CPU 25 also includes a ROM 27 storing, such as, a temperature correction table TB and control programs both related to the humidity detection. The CPU (one example of a correction circuit) 25 then corrects the read-out humidity value DSh based on the read-out temperature value DSt by using the temperature correction table TB.

2. Operation of the Humidity Detecting Device

Figure 2:
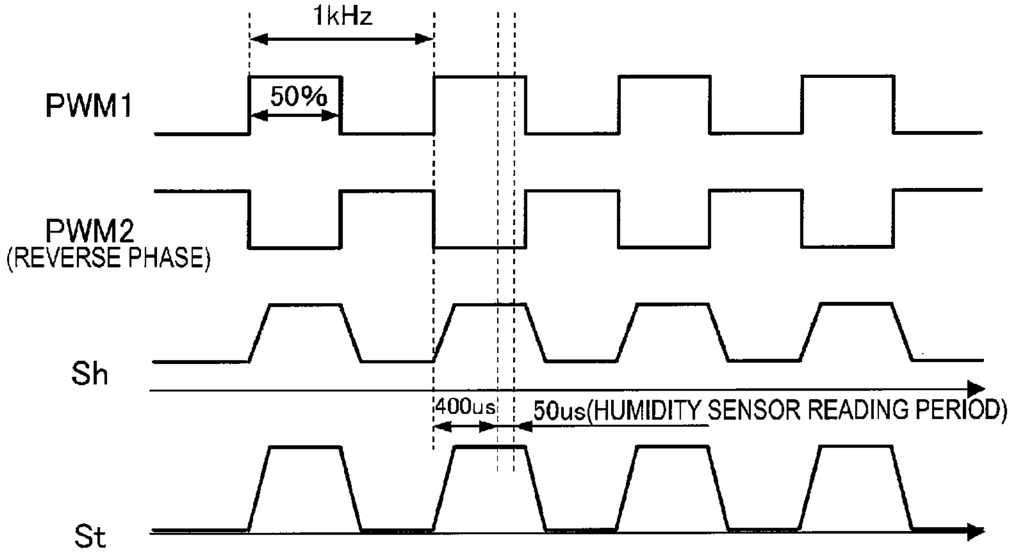
FIG. 2 is a time chart related to the humidity detection in one illustrative aspect.

FIG. 2 shows one example of a time chart of each signal of the humidity detecting device 1 at the time of humidity detection. As can be seen from FIG. 2, the first PWM signal PWM1 and the second PWM signal PWM2 are, for example, a pulse signal having a 50% duty ratio and a 1 kHz frequency. In addition, for example, in 50 μs after 400 μs from the rise of the first PWM signal PWM1, the A/D converter circuit 26 reads the humidity detection signal Sh and generates the read-out humidity value DSh.

Figure 3:
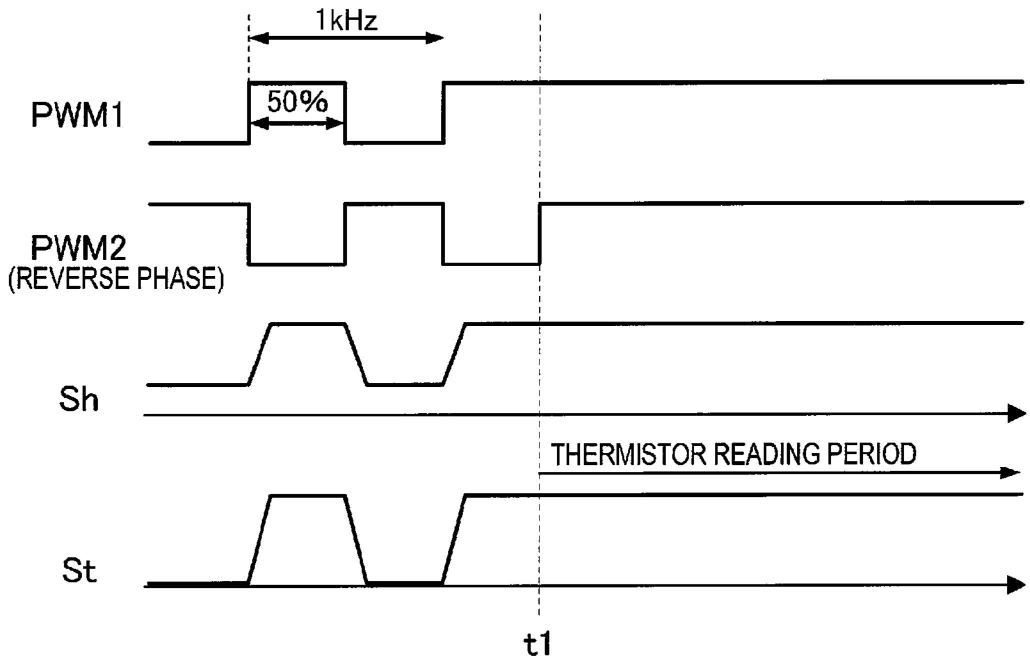
FIG. 3 is a time chart related to the temperature detection in one illustrative aspect.

FIG. 3 shows one example of a time chart of each signal of the humidity detecting device 1 at the time of temperature detection. As can be seen from FIG. 3, the CPU 25 at a starting time t1 of the temperature detection sets the first PWM signal PWM1 and the second PWM signal PWM2 as a constant voltage having the same voltage value. In this moment, the voltage to be applied to the humidity sensor 23 becomes zero, while a predetermined DC voltage is applied to the temperature sensor 24. Therefore, the humidity sensor 23 requiring AC drive can be protected, and at the same time, the degree of freedom of detection timing of the temperature sensor 24 can be improved as compared with the humidity detection.

Additionally, the impedance of the humidity sensor 23 changes according to the environmental temperature, due to the property of the humidity sensor 23 to be used. And therefore, in the present illustrative aspect, the CPU 25 uses, for example, the temperature correction table TB stored in the ROM 27 and corrects the read-out humidity value DSh based on the read-out temperature value DSt, as mentioned above. An example is described in the following.

Figure 4:
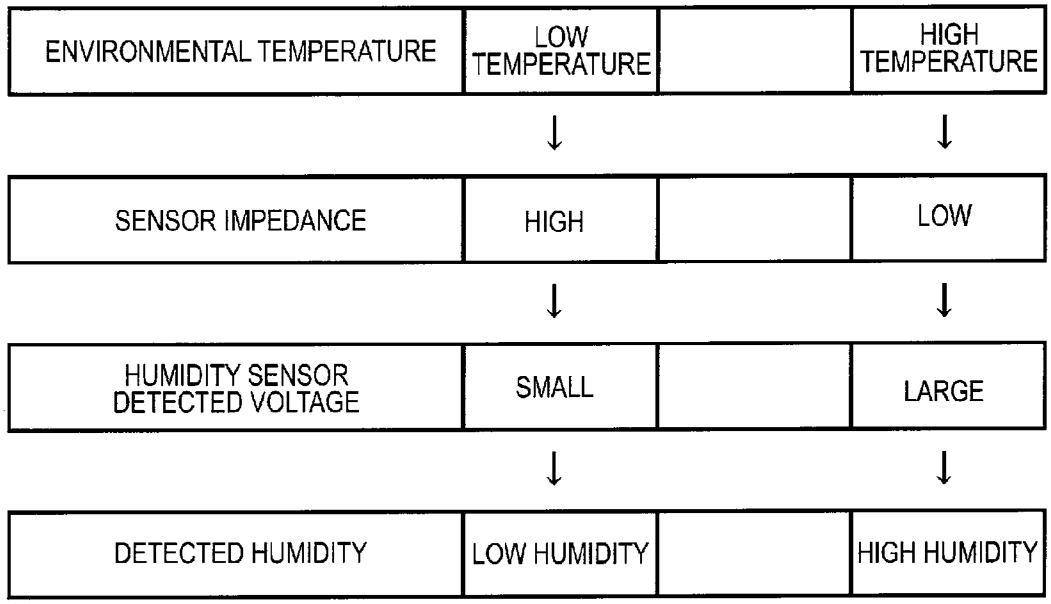
FIG. 4 is an explanatory diagram showing a relationship between an environmental temperature and a detected humidity.
Figure 5:
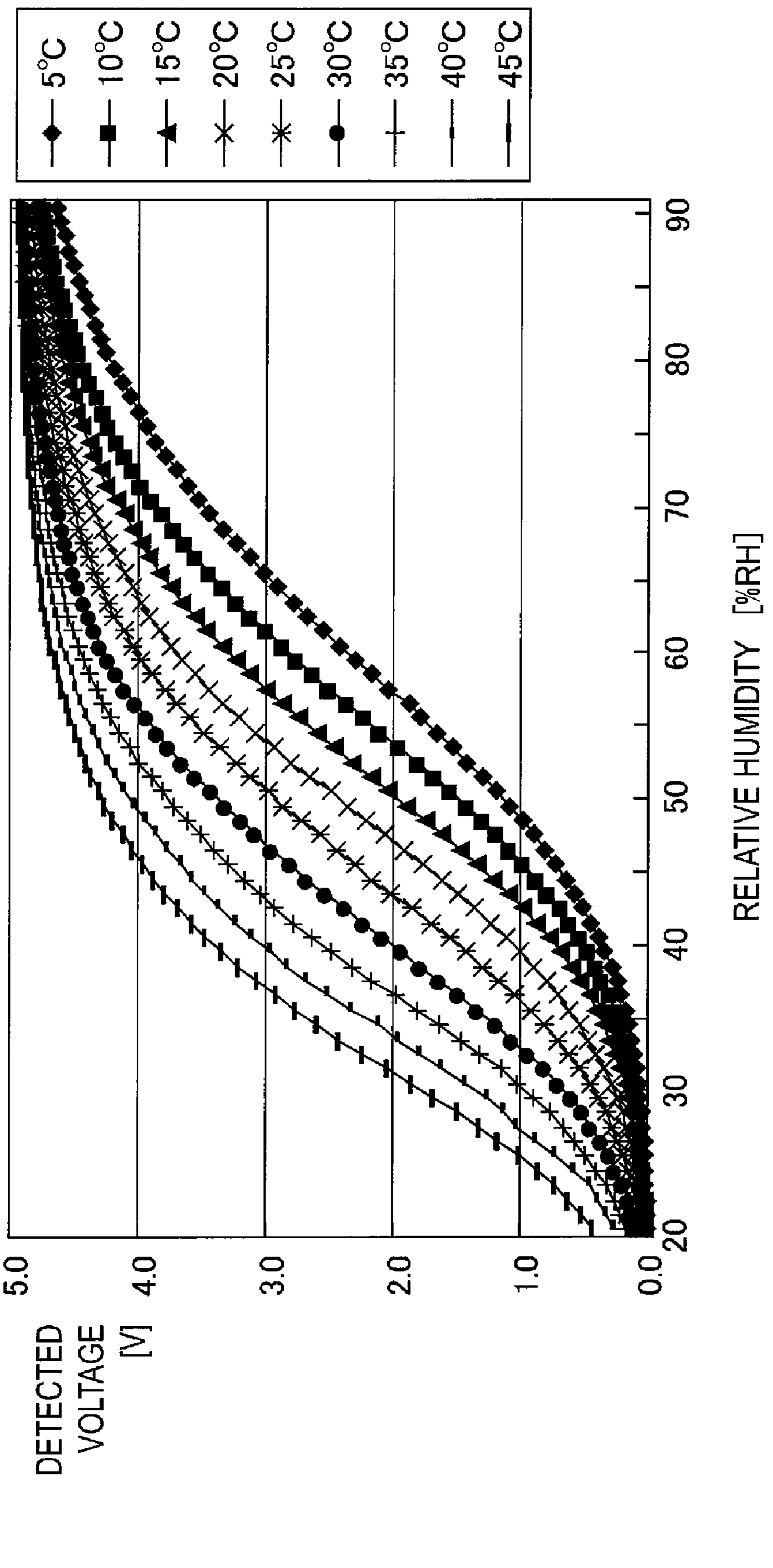
FIG. 5 is a graph showing a relationship between a detected humidity and a detected voltage at various environmental temperatures in one illustrative aspect.

FIG. 4 is an explanatory diagram showing a relationship of a detected humidity relative to an environmental temperature, and FIG. 5 is a graph showing this relationship. As can be seen from FIGS. 4 and 5, the impedance of the humidity sensor 23 lowers as the environmental temperature rises, and, in response to this change, the humidity detection signal Sh therefore increases, so as the detected humidity. In other words, even when the humidity detection signal Sh or the read-out humidity value DSh (as a detected voltage) is the same, the detected humidity may vary according to the environmental temperature.

The CPU 25 therefore uses, for example, the temperature correction table TB as illustrated in FIG. 6 showing a relationship between the detected voltage and the detected humidity at various environmental temperatures, for the purpose of correcting the read-out humidity value DSh as a detected voltage, based on the read-out temperature value DSt as an environmental temperature. In particular, the CPU 25 here reads out detected humidity data corresponding to the read-out humidity value (detected voltage) DSh and the read-out temperature value DSt from the temperature correction table TB, and then regards the read-out detected humidity data as a detected humidity. In short, the read-out humidity value (detected voltage) DSh here is not directly regarded as a detected humidity, but is corrected by the use of the temperature correction table TB to a detected humidity in accordance with the environmental temperature.

Figure 7:
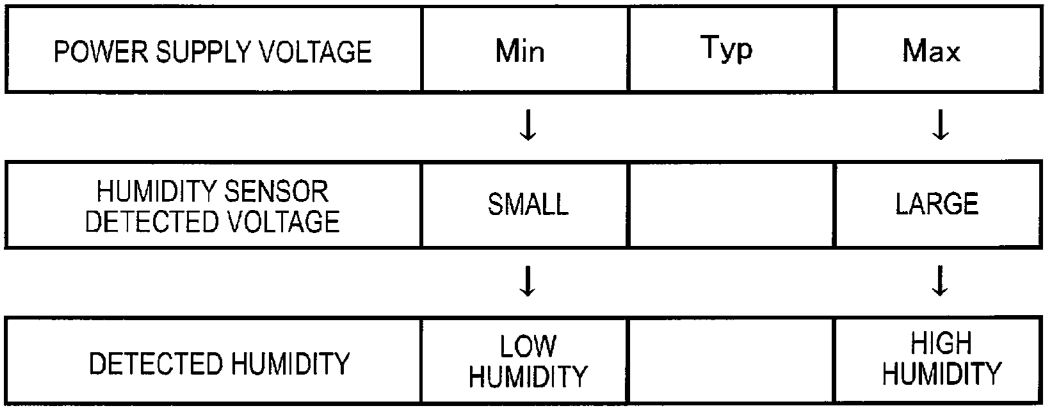
FIG. 7 is an explanatory diagram showing a relationship between a power supply voltage and a detected humidity.

Furthermore, the humidity detection signal (a detected voltage of the humidity sensor) Sh and the temperature detection signal (a detected voltage of the thermistor) St change according to fluctuations in the power supply voltage, and thus, each of the detected humidity and the detected temperature also changes. FIG. 7 is an explanatory diagram showing a relationship of a detected humidity relative to fluctuations in the power supply voltage, and FIG. 8 is an explanatory diagram showing a relationship of a detected temperature relative to fluctuations in the power supply voltage.

As illustrated in FIG. 7, a rise in the power supply voltage increases the humidity detection signal Sh, and the detected humidity therefore shifts to the high humidity side, while a fall in the power supply voltage decreases the humidity detection signal Sh, and the detected humidity therefore shifts to the low humidity side. Similar to the above, as illustrated in FIG. 8, a rise in the power supply voltage increases the temperature detection signal St, and the detected temperature therefore shifts to the high temperature side, while a fall in the power supply voltage decreases the temperature detection signal St, and the detected temperature therefore shifts to the low temperature side. In short, the detection result of each of the humidity sensor 23 and the temperature sensor (thermistor) 24 shows a similar change tendency relative to the fluctuation in the power supply voltage. Therefore, the power supply voltage (the first PWM signal PWM1) is made common between the humidity sensor 23 and the temperature sensor 24 in one illustrative aspect, thereby absorbing the fluctuations in the detected humidity caused by the variation in the power supply voltage.

In particular, as can be seen from the temperature correction table TB in FIG. 6, when, for example, there is no fluctuation in the power supply voltage, the read-out humidity value DSh is ‘14’, and the temperature at this moment is 10 degrees C., the corrected humidity is 35% RH.

In addition, due to the variation (fluctuation) of the power supply voltage toward the low pressure side, even when the read-out humidity value DSh is detected as being, for example, ‘12’ which is lower than the actual value, the detected temperature of the temperature sensor 24 is detected as 8 degrees C. which is also lower than the actual value, and consequently, as shown with an arrow A in FIG. 6, the corrected humidity is 35% RH. In short, the fluctuations in the detected humidity caused by the variation in the power supply voltage is absorbed.

Additionally, due to the variation of the power supply voltage toward the high pressure side, even when the read-out humidity value DSh is detected as being, for example, ‘16’ which is higher than the actual value, the detected temperature is detected as 12 degrees C. which is also higher than the actual value, and consequently, as shown with an arrow B in FIG. 6, the corrected humidity is 35% RH. In this case also, the fluctuations in the detected humidity caused by the variation in the power supply voltage is absorbed.

3. Effect of One Illustrative Aspect

The detection unit 21 is provided only with sensor elements of the humidity sensor 23 and the temperature sensor 24, thereby reducing the cost for the detection unit 21. And also, the detection unit 21 includes the common power supply line Lcom connected to the humidity sensor 23 and the temperature sensor 24, thereby reducing the number of signal lines connecting between the detection unit 21 and the controller 22, and thus reducing the wiring cost. And also, supplying the voltage to both the humidity sensor 23 and the temperature sensor 24 through the common power supply line Lcom enables such as variation of the power supply to be absorbed. In short, the configuration of present illustrative aspect improves the accuracy of the humidity detecting device 20, and at the same time, reducing the cost thereof.

Furthermore, even when a detected humidity varies according to the environmental temperature (as a result of depending on the property of the humidity sensor 23 to be used), the correction of the CPU 25 by using the temperature correction table TB enables a humidity to be detected without depending on the environmental temperature.

In reference to FIGS. 9 to 13, a humidity detecting device according to another illustrative aspect of the present invention is described. Additionally, the constituent elements same as those in one illustrative aspect are allocated with the same symbols, so that a repetitive description is omitted in order to describe differences only.

The difference from the previous illustrative aspect is that a humidity detecting device in this illustrative aspect changes the voltage level detected by a humidity detection resistor in accordance with the detected humidity range. That is, as shown in FIG. 5, the amount of change in the detected voltage relative to the detected humidity is small in both the low and high humidity areas. In other words, detection sensitivity in the low and high humidity areas deteriorates in humidity detection.

Therefore, in this illustrative aspect, in addition to the configuration in the previous illustrative aspect, ‘means for changing detected voltage level’ is included in order to change the detected voltage level according to the detected humidity area. In what follows, an example structure is shown, in which detection sensitivity in a predetermined humidity area is improved, by accommodating the detection property of the humidity sensor by means of the above-mentioned means for changing detected voltage level.

Figure 9:
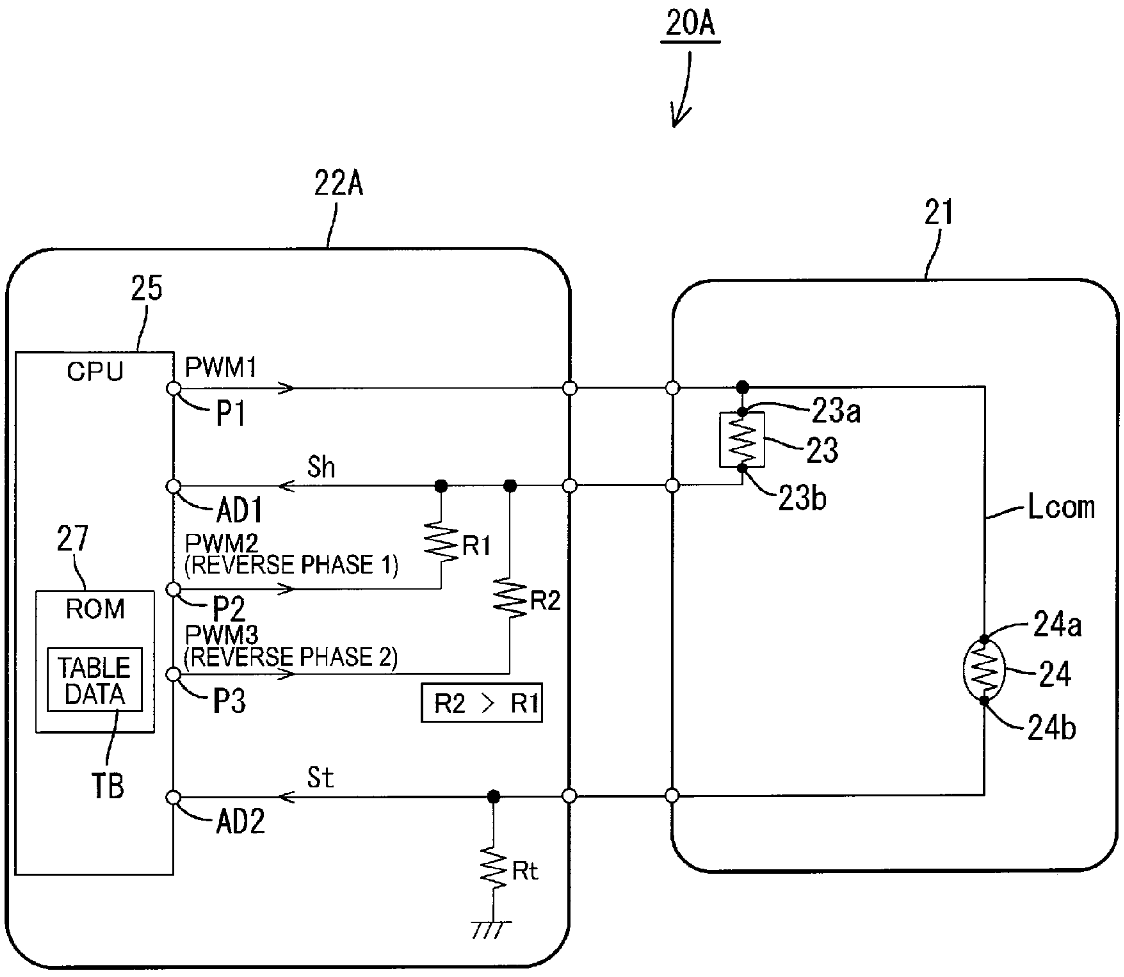
FIG. 9 is a schematic circuit diagram of a humidity detecting device in a first example according to another illustrative aspect of the present invention.
Figure 10:
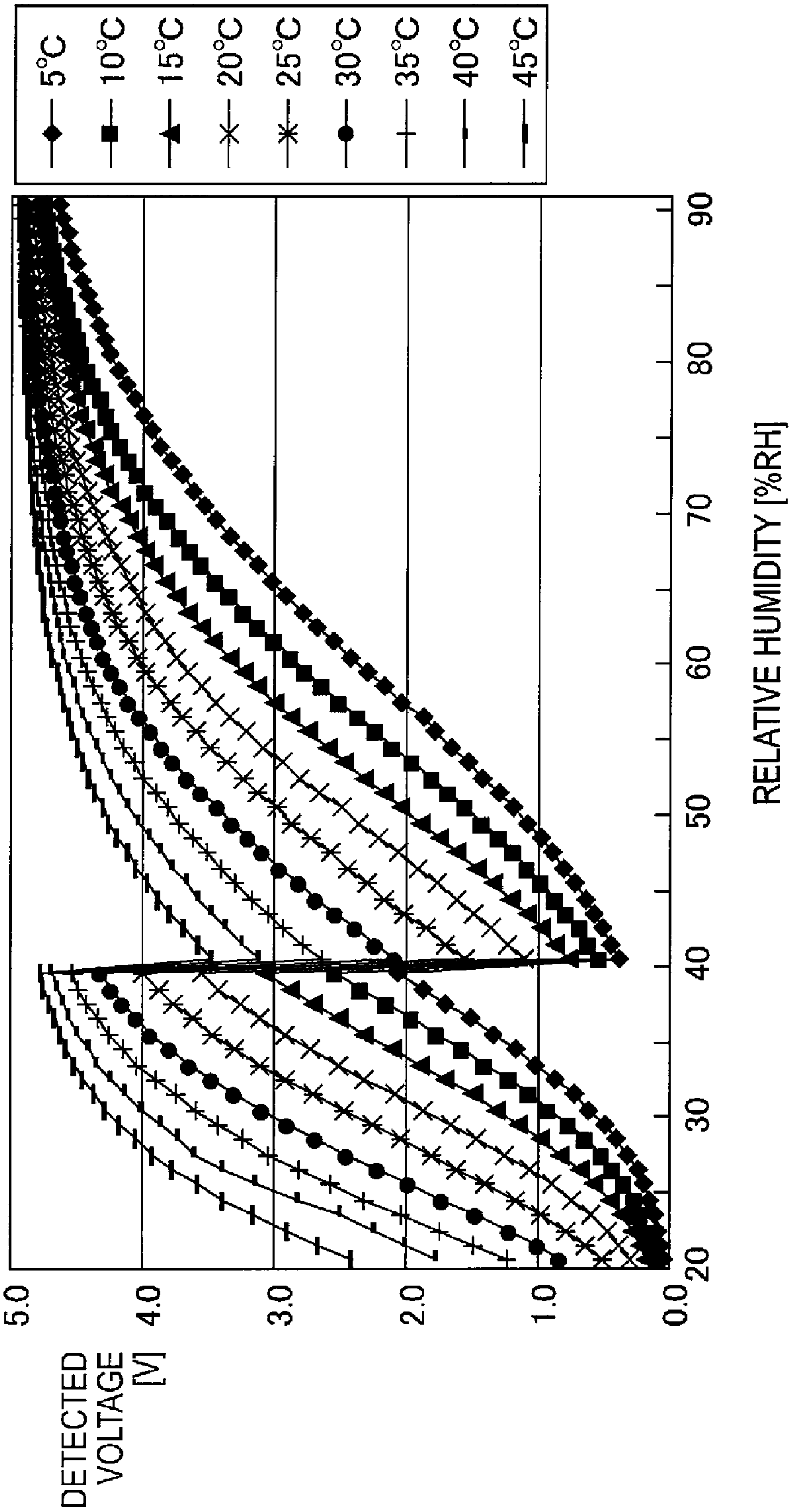
FIG. 10 is a graph showing a relationship between a detected humidity and a detected voltage at various environmental temperatures in the first example in another illustrative aspect.

In reference to FIGS. 9 to 10, a humidity detecting device 20A in first example of another illustrative aspect is described. FIG. 9 shows a configuration of the humidity detecting device 20A. In FIG. 9, a configuration related the means for changing detected voltage level is mainly illustrated, omitting other configurations shared with the previous illustrative aspect.

As shown in FIG. 9, in addition to the configuration of the humidity detecting device 20 in one illustrative aspect, the humidity detecting device 20A comprises, as means for changing detected voltage level, a third PWM port (one example of a third application section) P3 for applying a third PWM signal (one example of a third voltage) PW having a reverse phase against the first PWM signal PWM1 to the humidity sensor 23. Moreover, the humidity detecting device 20A further includes, as means for changing detected voltage level, a second detection resistor R2, which has a resistance value larger than that of the first detection resistor R1, and is connected between the second terminal 23*b* in the humidity sensor and a third PWM port P3 so as to generate a humidity detection signal.

When humidity is lower than or equal to a predetermined value, for example, lower than or equal to 40% RH, the CPU (one example of a selection circuit) 25 applies the first PWM signal PWM1 to the first terminal 23*a* in the humidity sensor at the time of humidity detection, and simultaneously, selects the third PWM port P3 from between the second PWM port P2 and the third PWM port P3, so that the third PWM signal PWM3 is applied to the second terminal 23*b* in the humidity sensor. Additionally, the waveform of the third PWM signal PWM3 is the same as that of the second PWM signal PWM2 shown in FIG. 2.

In this case, since the second detection resistor R2 has a resistance value larger than that of the first detection resistor R1, a detected voltage (humidity detection signal Sh) increases as compared with the first detection resistor R1, and thus, as shown in FIG. 10, the detected voltage corresponding to the humidity lower than or equal to 40% at each temperature increases. Therefore, according to the configuration of the humidity detecting device 20A in first example, detection sensitivity in the area having a humidity lower than or equal to a predetermined value, that is, in the low humidity area can be improved. In this case, the temperature correction table TB is also changed in accordance with the change in detection sensitivity.

Figure 11:
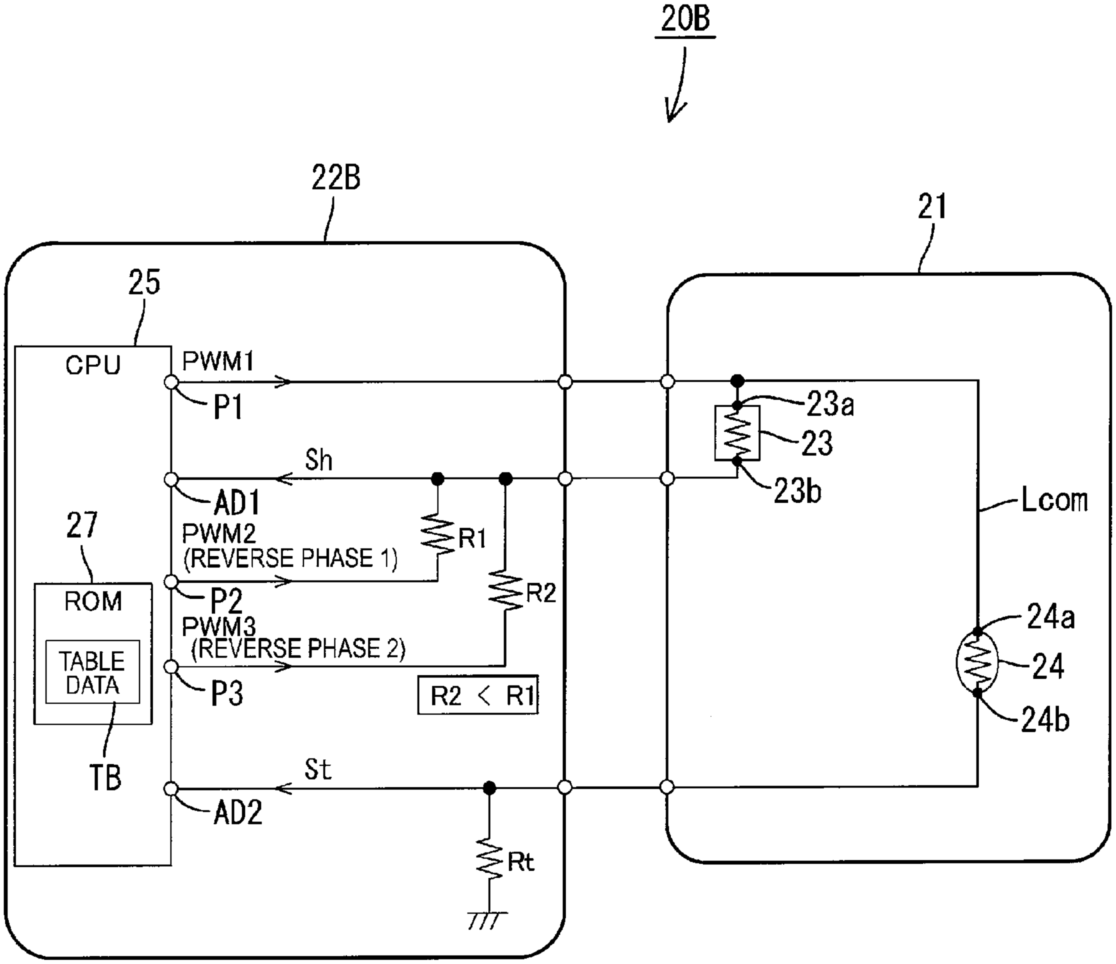
FIG. 11 is a schematic circuit diagram of a humidity detecting device in a second example according to another illustrative aspect.
Figure 12:
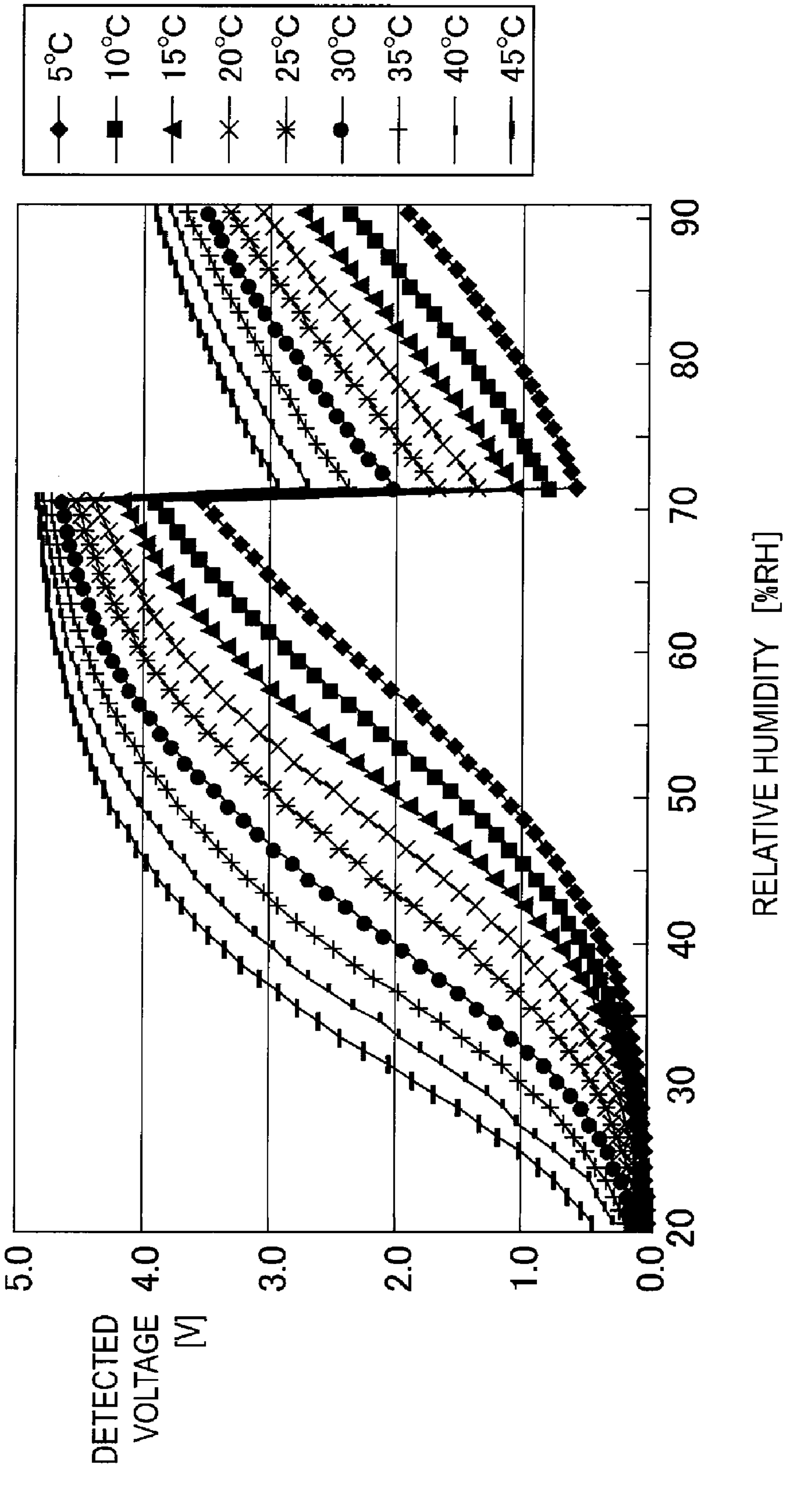
FIG. 12 is a graph showing a relationship between a detected humidity and a detected voltage at various environmental temperatures in the second example in another illustrative aspect.
Figure 13:
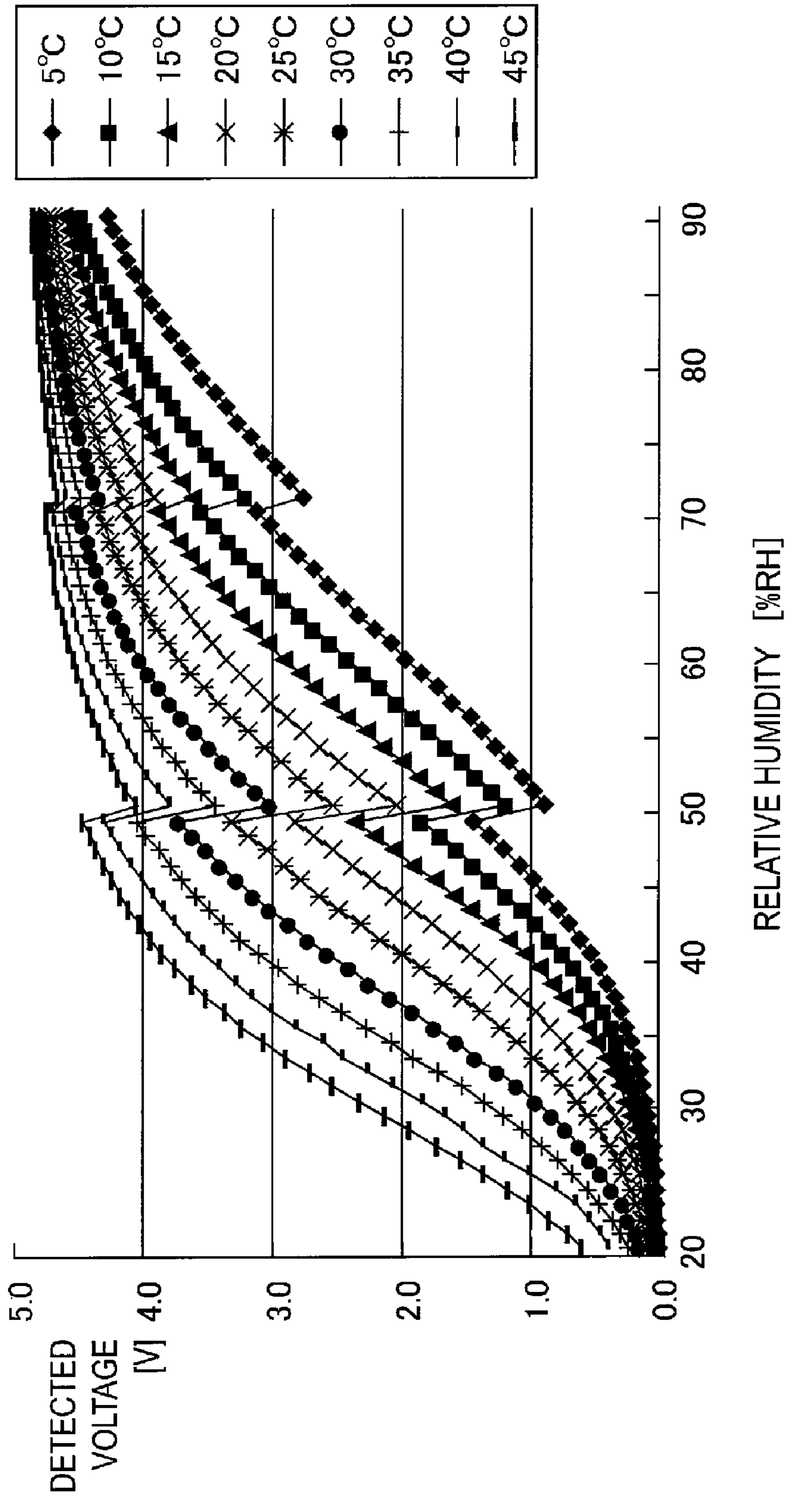
FIG. 13 is a graph showing a relationship between a detected humidity and a detected voltage at various environmental temperatures in another mode in the second example in another illustrative aspect.

Next, in reference to FIGS. 11 to 13, a humidity detecting device 20B in second example of another illustrative aspect is described. FIG. 11 shows a configuration of the humidity detecting device 20B. In FIG. 11, similar to FIG. 9, a configuration relative to means for changing detected voltage level is mainly illustrated, omitting other configurations shared with the previous illustrative aspect.

As shown in FIG. 11, the humidity detecting device 20B has the same configuration as the humidity detecting device 20A in first example. The difference from the humidity detecting device 20A in first example is only that the second detection resistor R2 has a resistance value lower than that of the first detection resistor R1.

When a humidity is equal to or higher than a predetermined value, for example, equal to or higher than 70% RH, the CPU 25 applies the first PWM signal PWM1 to the first terminal 23*a* in the humidity sensor at the time of humidity detection and simultaneously selects the third PWM port P3, so that the third PWM signal PWM3 is applied to the second terminal 23*b* in the humidity sensor.

In this case, since the second detection resistor R2 has a resistance value lower than that of the first detection resistor R1, the detected voltage (humidity detection signal Sh) decreases, and as can be seen from FIG. 12, the detected voltage corresponding to the humidity equal to or higher than 70% RH at each temperature therefore decreases. Consequently, according to the configuration of the humidity detecting device 20B in second example, detection sensitivity in the area having a humidity equal to or higher than a predetermined value (that is, in the high humidity area) can be improved. In this case, the temperature correction table TB is also changed in accordance with the change in detection sensitivity.

Additionally, in second example, each value of the first detection resistor R1 and the second detection resistor R2 is set to a predetermined value, and at the same time, selection between the second PWM port P2 and the third PWM port P3 is appropriately conducted, so that, as shown in FIG. 13, detection sensitivity in both the low and high humidity areas can be improved.

In particular, as can be seen from FIG. 13, in the environment having a first humidity lower than or equal to a first predetermined humidity, for example, 50% RH, the second PWM port P2 is selected; in the environment having a second humidity higher than 50% RH and lower than a second predetermined humidity, for example, 70% RH, the third PWM port P3 is selected; and in the environment having a third humidity equal to or higher than 70% RH, the second PWM port P2 and the third PWM port P3 are selected. This allows humidity to be preferably detected in a wide-range of humidity detection area.

Figure 14:
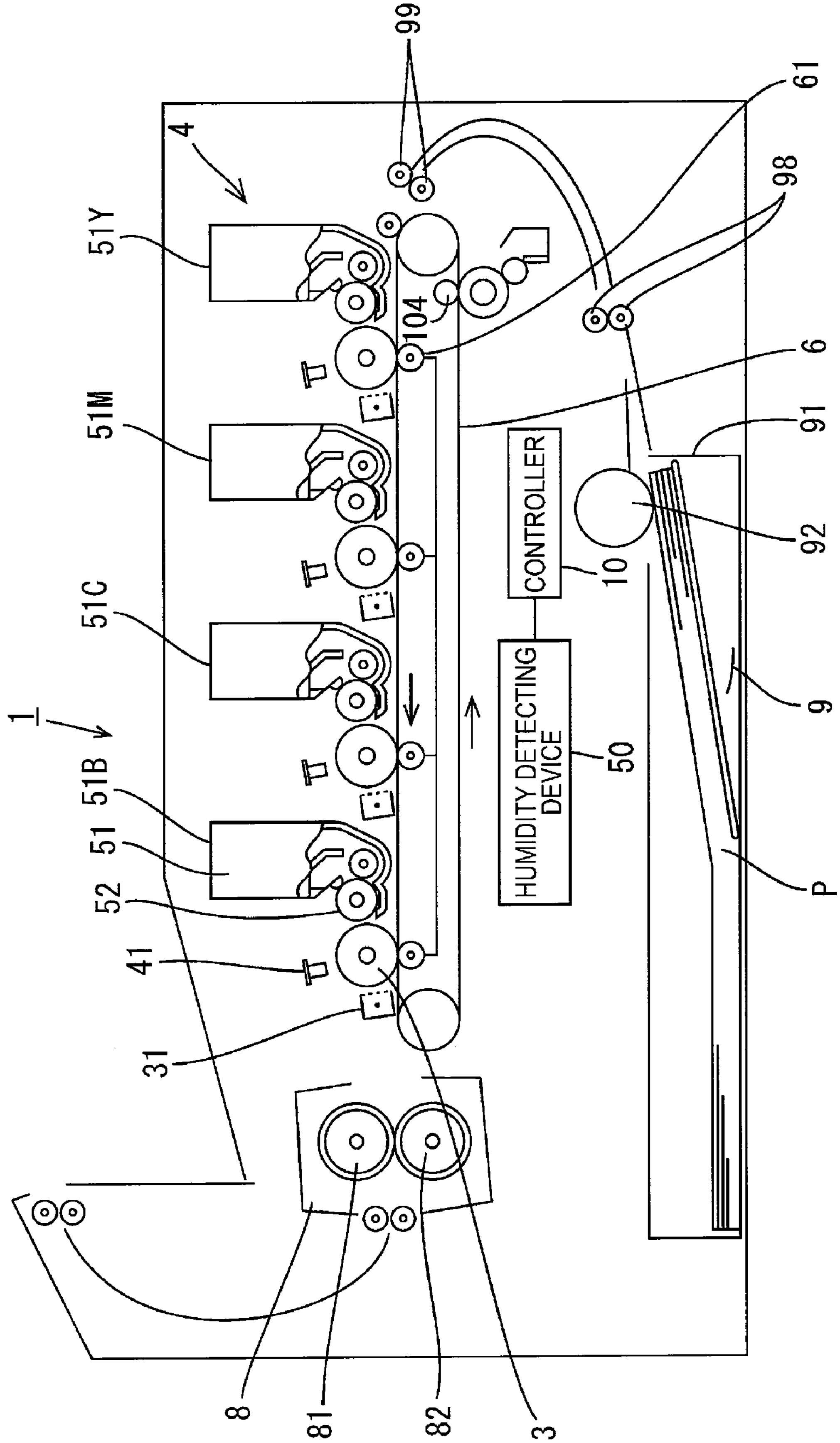
FIG. 14 is a schematic circuit diagram of an image forming apparatus according to further illustrative aspect of the present invention.

Next, referring to FIG. 14, an image forming apparatus according to further illustrative aspect of the present invention is described. FIG. 14 is a schematic cross sectional view showing the internal configuration of a color laser printer (hereinafter referred to simply as 'printer 1') as an image forming apparatus according to further illustrative aspect of the present invention. In addition, an image forming apparatus is not limited to a color laser printer, and may be a black-and-white printer or a so-called MFP including, for example, a copy function.

The printer 1 illustrated in FIG. 14 includes such as a toner image forming unit (one example of an image forming unit) 4, a paper carrying belt 6, a fixing unit 8, a paper feeder 9, a printer controller (one example of a control means) 10, and a humidity detecting device 50, and forms on a paper sheet P as a print media according to input image data. Herein, the term "paper" is broadly referred as any media used to produce an image thereon, for example plastic can be used, or the like. Here, the humidity detecting device 50 is any one of the humidity detecting devices 20, 20A, and 20B described in the above-mentioned illustrative aspects.

And the toner image forming unit 4 includes developing units 51Y, 51M, 51C and 51B respectively storing yellow, magenta, cyan, and black toners, photosensitive drums 3, chargers 31 for uniformly charging the photosensitive drums 3, and scanner units 41 for forming an electrostatic latent image corresponding to image data by exposing a surface of the charged photosensitive drums 3 with, for example, a laser light. Additionally, regarding the scanner unit 41, the illustration of the most part is omitted, and only the section from which a laser light is finally emitted is shown.

Also, each of the developing units 51Y, 51M, 51C, and 51B has a developing roller 52 for providing toner onto the photosensitive drum 3, and develops a toner image corresponding to an electrostatic latent image formed on the photosensitive drum 3.

On the other hand, the paper feeder 9 is composed of a storage tray 91 for storing the paper sheet P and a pick-up roller 92 for delivering the paper sheet (the printing object) P. The paper sheet P stored in the storage tray 91 is then picked up one by one from the paper feeder 9 by the pick-up roller 92, and delivered to the paper carrying belt 6 via a carrying roller 98 and a registration roller 99.

The paper carrying belt 6 is constituted in an endless manner so as to travel integrally with the paper sheet P with the paper sheet P supported on the upper surface thereof. In proximity of positions opposing to each of the photosensitive drums 3, transfer rollers 61 are provided having a paper carrying belt 6 there-between. And, as can be seen from the paper carrying belt 6 illustrated in FIG. 14, the surface in the side opposing to the photosensitive drum 3 moves from the right to the left in the figure, so that the paper sheet P delivered from the registration roller 99 is sequentially carried to the gap between the belt and the photosensitive drum 3 and then to the fixing unit 8.

The transfer roller 61 transfers to the paper sheet P delivered by the paper carrying belt 6 a toner image, which is formed on the photosensitive drum 3, with a transfer bias (for example, −10 to −11 μA, the maximum voltage is 6 kV) having a reverse polarity against the charged polarity of the toner applied to the gap between the transfer roller 61 and the photosensitive drum 3 by a high voltage controller (not shown).

In addition, the fixing unit 8 is composed of a heating roller 81 and a pressing roller 82, and fixes a paper sheet P, on which a toner image has been transferred, by heating and pressing as catching and conveying by the heating roller 81 and the pressing roller 82.

A printer controller 10 is composed of such as a controlling device employing a CPU not shown, and controls the general motion of the printer 1. The printer controller 10 also controls image forming processing of the toner image forming unit 4 based on a humidity detected by the humidity detecting device 50. In particular, for example, a bias for charging the toner in the toner image forming unit 4 is controlled according to a detected humidity, and a toner supply amount from the developing unit 51 to the photosensitive drum 3 is controlled according to the humidity. Or, a transfer bias to be applied to the transfer roller 61 is controlled according to a detected humidity, so that a toner image is preferably transferred onto the paper sheet P without depending on the humidity. In short, the printer controller 10 maintains a predetermined quality of a formed image based on a humidity detected by the humidity detecting device 50 without depending on the humidity.

Therefore, the configuration in further illustrative aspect enables the accuracy of the humidity detecting device 50 in the image forming apparatus 1 to be improved so that the quality of a formed image is improved, while at the same time, reducing the cost of the humidity detecting device 50.

The present invention is not limited to the illustrative aspects described in the above description made with reference to the accompanying figures, but the following aspects may be included in the technical scope of the present invention, for example.

(1) In each of the above illustrative aspects, a polymer-based water-soluble humidity sensor is used as the humidity sensor 23, and the humidity sensor 23 is driven in alternate current by using a first PWM signal PWM1 and a second PWM signal PWM2, however, the configuration is not limited to this. A humidity sensor of a type not requiring AC drive may also be used as the humidity sensor 23. And if so, a variable resistance humidity sensor is preferred, however, may not necessarily be so. In addition, the power supply voltage may also be any type that is applied to the humidity sensor and the temperature sensor via a common power supply line, and is not limited to two PWM signals. Further, this configuration is not limited to a PWM signal.

(2) In each of the above illustrative aspects, the first PWM signal PWM1, which is to be supplied to the common power supply line Lcom, is also supplied to the A/D converter circuit 26 via the input terminal Vref, however, this configuration may be omitted. Also, the output buffer 28 may also be omitted.

(3) In each of the above illustrative aspects, as a power supply signal for alternately driving the humidity sensor 23, two PWM signals (rectangular wave signal) having mutually reverse phases and 50% duty ratio are used, however, it is not limited to this. For example, the PWM signal is neither limited to a 50% duty ratio, nor a rectangular wave signal. The power supply signal may be any type that can alternately drive the humidity sensor 23, and may be, for example, trapezoid waves having mutually reverse phases.

Figure 15:
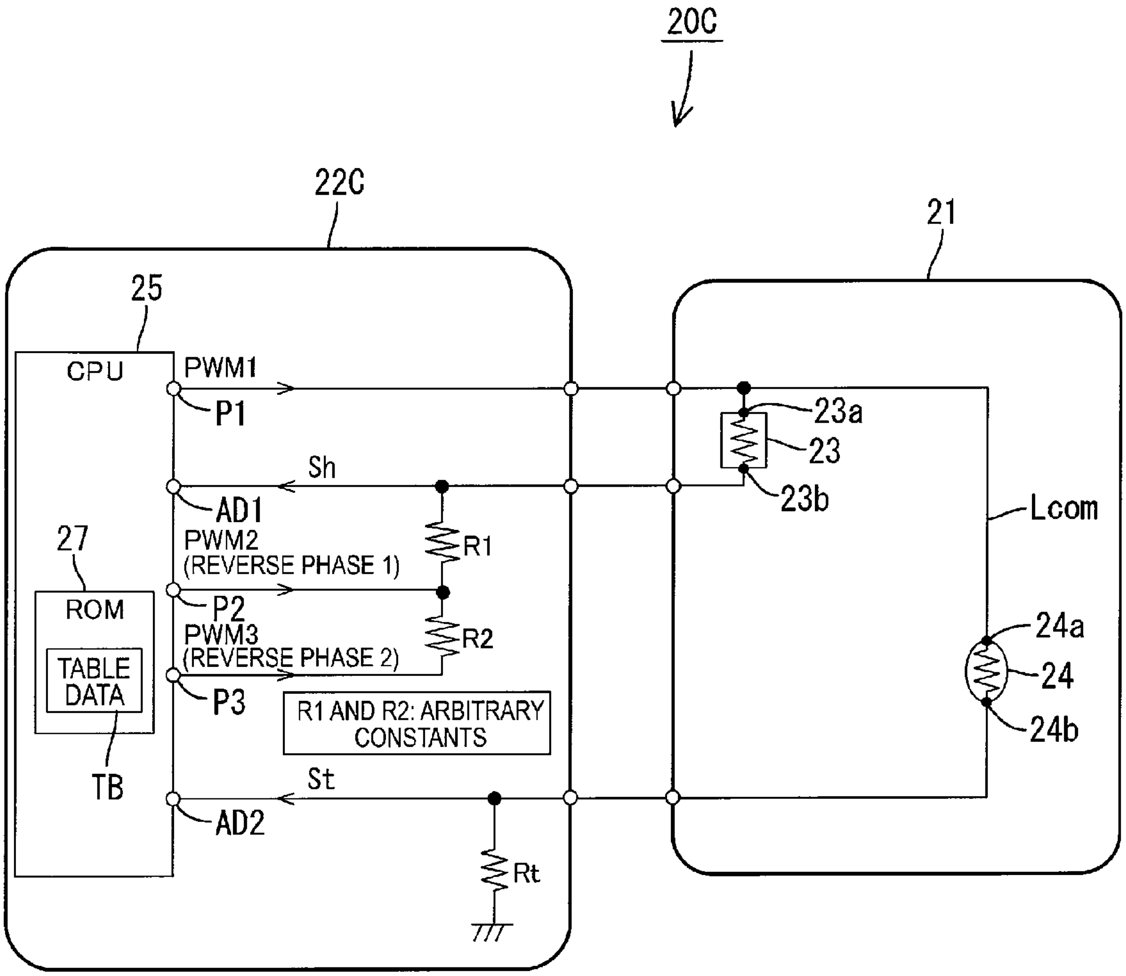
FIG. 15 is a schematic circuit diagram of a humidity detecting device in another example according to another illustrative aspect of the present invention.

(4) The example of means for changing detected voltage level in another illustrative aspect that changes the level of a detected voltage in accordance with a detected humidity range is not limited to the configuration described in the above examples. For example, as illustrated in FIG. 15, the second detection resistor R2 is connected between the second PWM port P2 and the third PWM port P3, while being series-connected with the first detection resistor R1. And the CPU 25 selects any one of the second PWM port P2 and the third PWM port P3 in accordance with a detected humidity. This configuration allows a humidity to be preferably detected in the low or high humidity areas, by accordingly setting the value of the first detection resistor and the second detection resistor, while at the same time, accordingly selecting between the second voltage and the third voltage. In short, the same effect as those of first and second examples can be obtained.

Figure 16:
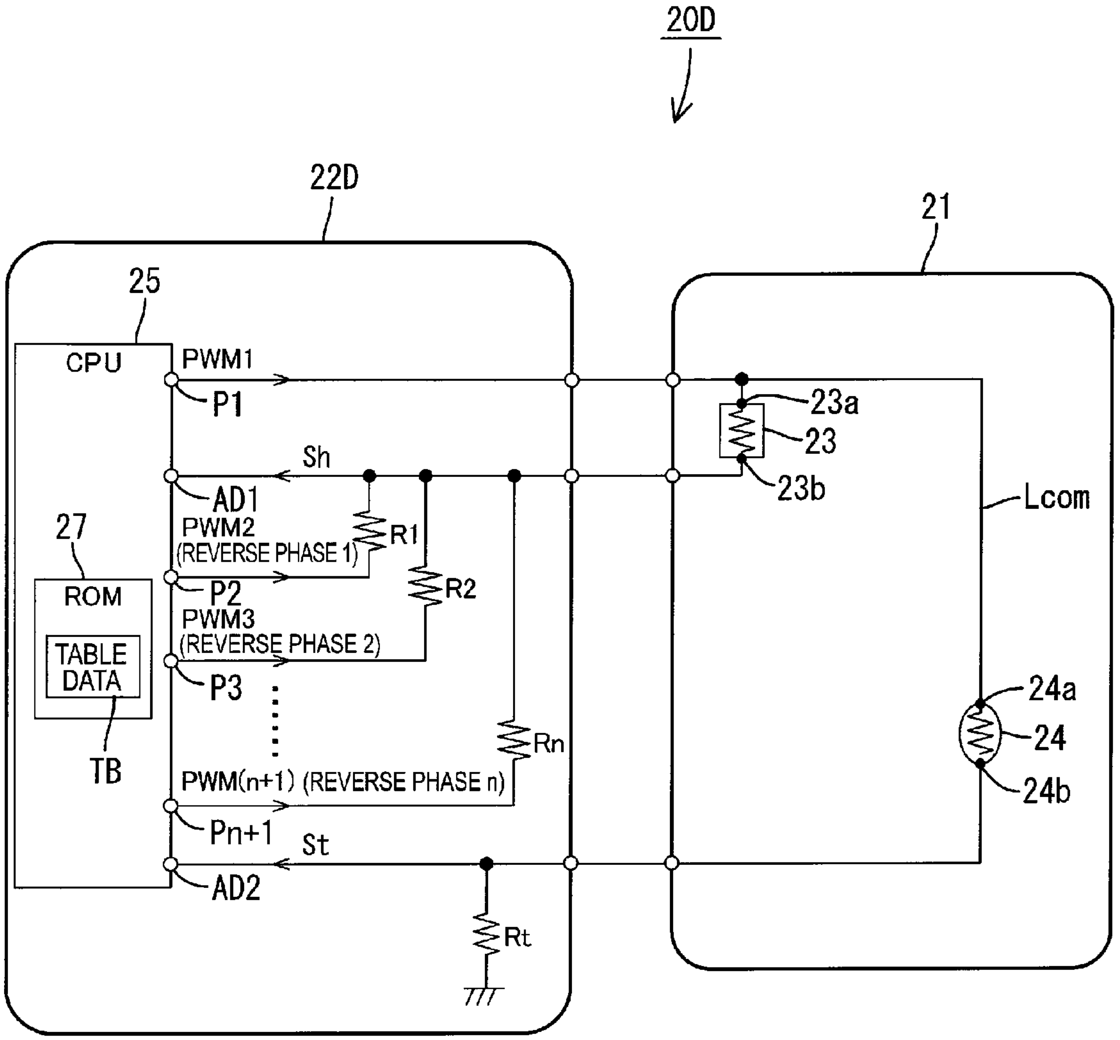
FIG. 16 is a schematic circuit diagram of a humidity detecting device in another example according to another illustrative aspect of the present invention.

And as shown in FIG. 16, when the number of the detection resistor and the reverse phase PWM port provided therein is (n) (n is a integral number equal to or more than one), the number of phases for changing the level of a detected voltage equals (n+nC2+nC3+ . . . +nCn) phases, and thus, the detected humidity range can be switched in more detail according to needs. In short, a humidity can be detected more precisely in a wide range from the low humidity to the high humidity by accommodating the detection property of the humidity sensor.

Figure 17:
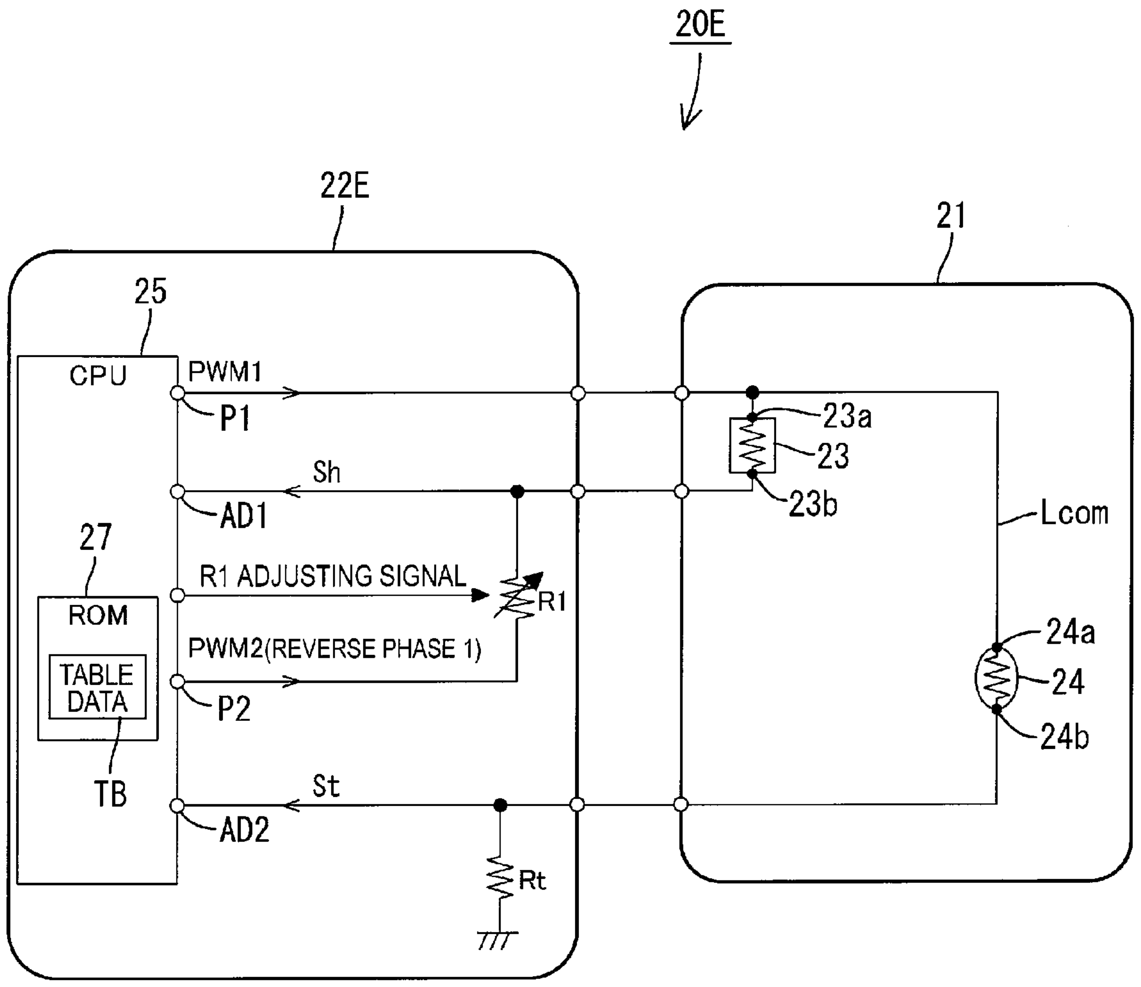
FIG. 17 is a schematic circuit diagram of a humidity detecting device in another example according to another illustrative aspect of the present invention.

Furthermore, in the example shown in FIG. 16, the same effect can be obtained through a simple configuration, in which a variable resistor or a digital potentiometer (R1) as illustrated in FIG. 17 is provided as the first detection resistor R1. And if so, a digital potentiometer can control more precisely the value of the first detection resistor R1. Additionally, in FIGS. 15 to 17, configurations related to the means for changing detected voltage level are mainly illustrated, omitting other common configurations.

What is claimed is:

1. A humidity detecting device comprising:
a detection unit including
a humidity sensor capable of detecting a humidity and generating a humidity detection signal,
a temperature sensor which detects a temperature surrounding the humidity sensor and generates a temperature detection signal, wherein the humidity sensor and the temperature sensor are connected by a common power supply line; and
a controller including
an application circuit for applying a power supply voltage to the humidity sensor and the temperature sensor through the common power supply line,
a read circuit for producing a read-out humidity value corresponding to the humidity detection signal and a read-out temperature value corresponding to the temperature detection signal, and
a correction circuit for correcting the read-out humidity value based on the read-out temperature value.

2. The humidity detecting device according to claim 1,
wherein the application circuit applies, at the time of humidity detection, AC voltage to the humidity sensor as the power supply voltage.

3. The humidity detecting device according to claim 2, wherein the application circuit includes a first application section for applying a first voltage to one end of the humidity sensor and a second application section for applying a second voltage having a reverse phase against the first voltage to the other end of the humidity sensor, and the controller includes a first detection resistor, which is connected between the other end of the humidity sensor and the second application section for generating the humidity detection signal.

4. The humidity detecting device according to claim 3, wherein the first detection resistor is any one of a variable resistor and a digital potentiometer.

5. The humidity detecting device according to claim 3, wherein the application circuit applies to the detection unit the first voltage and the second voltage and/or the third voltage as constant voltages having the same voltage value, at the time of the temperature detection.

6. The humidity detecting device according to claim 3, wherein the first voltage output from the first application section is directly input into the read circuit as a reference voltage for comparison of the read circuit.

7. The humidity detecting device according to claim 2, wherein the application circuit includes a first application section for applying a first voltage to one end of the humidity sensor, a second application section for applying a second voltage having a reverse phase against the first voltage to the other end of the humidity sensor, and a third application section for applying a third voltage having a reverse phase against the first voltage to the other end of the humidity sensor, and the controller further includes a first detection resistor, which is connected between the other end of the humidity sensor and the second application section for generating the humidity detection signal, and a second detection resistor, which is connected between the other end of the humidity sensor and the third application section for generating the humidity detection signal.

8. The humidity detecting device according to claim 7, wherein the controller further includes a selection circuit for selecting at least one of the second application section and the third application section according to a detected humidity.

9. The humidity detecting device according to claim 8, wherein a value of the second detection resistor is larger than that of the first detection resistor, and the selection circuit selects the third application section in an environment with a humidity lower than or equal to a predetermined value.

10. The humidity detecting device according to claim 8, wherein a value of the first detection resistor is larger than that of the second detection resistor, and the selection circuit selects the third application section in an environment with a humidity equal to or higher than a predetermined value.

11. The humidity detecting device according to claim 10, wherein the humidity sensor is a polymer-based water-soluble humidity sensor.

12. The humidity detecting device according to claim 8, wherein a value of the first detection resistor is larger than that of the second detection resistor, and the selection circuit selects the second application section in an environment with a first humidity lower than or equal to a first predetermined humidity, selects the third application section in an environment with a second humidity higher than a first predetermined humidity and lower than a second predetermined humidity, and selects the second and third application sections in an environment with a third humidity equal to or higher than a second predetermined humidity.

13. The humidity detecting device according to claim 12, wherein the humidity sensor is a polymer-based water-soluble humidity sensor.

14. The humidity detecting device according to claim 2, wherein the application circuit includes a first application section for applying a first voltage to one end of the humidity sensor, a second application section for applying a second voltage having a reverse phase against the first voltage to the other end of the humidity sensor, and a third application section for applying a third voltage having a reverse phase against the first voltage to the other end of the humidity sensor, and the controller further includes a first detection resistor, which is connected between the other end of the humidity sensor and the second application section for generating the humidity detection signal, a second detection resistor, which is connected between the second application section and the third application section, and connected in series with the first detection resistor, and a selection circuit for selecting any one of the second application section and the third application section according to a detected humidity.

15. The humidity detecting device according to claim 1, wherein the humidity sensor and the temperature sensor are provided on a substrate.

16. An image forming apparatus comprising:

a humidity detecting device having a detection unit including a humidity sensor capable of detecting a humidity and generating a humidity detection signal, a temperature sensor capable of detecting a temperature surrounding the humidity sensor and generating a temperature detection signal, wherein the humidity sensor and the temperature sensor are connected by a common power supply line; and a controller including an application circuit for applying a power supply voltage to the humidity sensor and the temperature sensor through the common power supply line, a read circuit for producing a read-out humidity value corresponding to the humidity detection signal and a read-out temperature value corresponding to the temperature detection signal, and a correction circuit for correcting the read-out humidity value based on the read-out temperature value;

an image forming unit for forming an image on a subject article based on an image data; and a controlling device for controlling image forming processing of the image forming unit based on a detected humidity detected by the humidity detection unit.

* * * * *